United States Patent [19]
Spadaccini et al.

[11] Patent Number: 5,165,224
[45] Date of Patent: Nov. 24, 1992

[54] METHOD AND SYSTEM FOR LEAN PREMIXED/PREVAPORIZED COMBUSTION

[75] Inventors: Louis J. Spadaccini, Manchester; Arthur S. Kesten, West Hartford; Roy N. Guile, Wethersfield, all of Conn.

[73] Assignee: United Technologies Corporation, Hartford, Conn.

[21] Appl. No.: 701,421

[22] Filed: May 15, 1991

[51] Int. Cl.$^5$ .............................. F02C 1/00
[52] U.S. Cl. .......................... 60/39.02; 60/723; 60/737
[58] Field of Search ............... 60/39.02, 39.822, 723, 60/732, 737; 431/7, 170, 328; 123/3

[56] References Cited

U.S. PATENT DOCUMENTS

| | | | |
|---|---|---|---|
| 2,655,786 | 10/1953 | Carr | 60/35.4 |
| 2,951,883 | 9/1960 | Kroeper et al. | |
| 2,979,293 | 4/1961 | Mount | |
| 3,006,142 | 10/1961 | Carr | |
| 3,357,916 | 12/1967 | Smith | 208/120 |
| 3,438,602 | 4/1969 | Noddings et al. | |
| 3,690,100 | 9/1972 | Wolf et al. | 60/206 |
| 3,739,581 | 6/1973 | Talmor | 60/723 |
| 3,797,231 | 3/1974 | McLean | 60/39.512 |
| 3,855,980 | 12/1974 | Weisz et al. | 123/3 |
| 3,940,923 | 3/1976 | Pfefferle | 60/39.06 |
| 4,185,456 | 1/1980 | Cummings | 60/39.02 |
| 4,273,304 | 6/1981 | Frosch et al. | 244/117 |
| 4,444,158 | 4/1984 | Yoon | 123/3 |
| 4,722,303 | 2/1988 | Leonhard | 123/3 |
| 4,754,607 | 7/1988 | Mackay | 60/723 |
| 4,938,685 | 7/1990 | Noakes et al. | 437/7 |

OTHER PUBLICATIONS

Dehydrogenation of Hydrocarbons Over a Chromia-Alumina Catalyst in the Absence of Added Hydrogen, by A. W. Ritchie et al., published in I&EC Product Research And Development, vol. 4, No. 2 (Jun. 1965) at pp. 129-136.

Cooling of Advanced Engines by Endothermic Reactions of Hydrocarbon Fuels, by L. E. Faith, et al., abstracted as Chemical Abstracts 75:14252.

"Endothermic Fuels for Hypersonic Vehicles," By Lander et al., Journal of Aircraft, vol. 8, No. 4, pp. 200-207, 1971.

Primary Examiner—Richard A. Bertsch
Assistant Examiner—Timothy S. Thorpe
Attorney, Agent, or Firm—George J. Romanik

[57] ABSTRACT

A method of combusting an endothermic fuel in a lean premixed/prevaporized combustion system includes transferring thermal energy from a combustion air stream to an endothermic fuel decomposition catalyst to cool the combustion air stream and heat the fuel and catalyst to a temperature sufficient to endothermically decompose an endothermic fuel. The catalyst is contacted with fuel to cause the fuel to endothermically decompose into a reaction product stream. The reaction product stream is mixed with the cooled combustion air stream to form a well-mixed, uniformly lean fuel/air mixture and the fuel/air mixture is combusted at an equivalence ratio of less than 1 to produce a combustion product stream. The invention also includes a system for practicing the method.

21 Claims, 4 Drawing Sheets

METHOD AND SYSTEM FOR LEAN PREMIXED/PREVAPORIZED COMBUSTION

CROSS-REFERENCE TO RELATED APPLICATIONS

This application is related to U.S. application Ser. No. 07/612,763 filed on Nov. 14, 1990 entitled "Method and Apparatus to Enhance Combustion Rates and Extend Extinction Limits in High Speed Propulsion Units", U.S. application Ser. No. 701,430 filed on even date herewith entitled "Method of Cooling With an Endothermic Fuel", and commonly assigned U.S. application Ser. Nos. R-3518 entitled "Method of Cooling With an Endothermic Fuel", 701,420 entitled "Endothermic Fuel Systems", and R-3509 entitled "Method and System for Staged Rich/Lean Combustion", all of which are filed on even date herewith.

TECHNICAL FIELD

The present invention is directed to a method and system for reducing $NO_x$ emissions using lean premixed/prevaporized combustion.

BACKGROUND ART

It has long been known that exhaust gases produced by combusting hydrocarbon and other fuels can contribute to atmospheric pollution. Exhaust gases typically contain pollutants such as nitric oxide (NO) and nitrogen dioxide ($NO_2$), which are frequently grouped together as $NO_x$, unburned hydrocarbons (UHC), carbon monoxide (CO), and particulates, primarily carbon soot. Nitrogen oxides are of particular concern because of their role in forming ground level smog and acid rain and in depleting stratospheric ozone. $NO_x$ may be formed by several mechanisms. First, the high temperature reaction of atmospheric oxygen with atmospheric nitrogen, particularly at adiabatic flame temperatures above about 2800° F., forms "thermal $NO_x$" through the Zeldovich mechanism. Second, the reaction of atmospheric nitrogen with hydrocarbon fuel fragments ($CH_i$), particularly under fuel-rich conditions, forms "prompt $NO_x$". Finally, the reaction of nitrogen released from a nitrogen-containing fuel with atmospheric oxygen, particularly under fuel-lean conditions, forms "fuel-bound $NO_x$". In typical combustors, atmospheric oxygen and nitrogen are readily available in the combustion air which is mixed with the fuel.

Various combustor strategies can be employed to decrease the formation of thermal and prompt $NO_x$. For example, a combustor may be configured to operate uniformly fuel-lean, that is, at an equivalence ratio less than 1.0. The equivalence ratio is the ratio of the actual fuel/air ratio to the fuel/air ratio required for stoichiometric combustion. An equivalence ratio greater than 1.0 indicates fuel-rich conditions, while an equivalence ratio less than 1.0 indicates fuel-lean conditions. Fuel-lean operation lowers adiabatic flame temperature, resulting in lower thermal $NO_x$ formation, and decreases the formation of prompt $NO_x$.

In lean premixed/prevaporized (LPP) combustion fuel and air are mixed upstream of a combustor to form a well-mixed, uniformly lean, gaseous fuel/air mixture which is then combusted at a uniformly low temperature and low gas residence time. A well-mixed fuel/air mixture permits leaner combustion and, therefore, lower adiabatic flame temperatures, resulting in lower thermal $NO_x$ production. A uniformly lean fuel/air mixture has a uniformly low $CH_i$ concentration, that is, no regions of high $CH_i$ concentration, decreasing the production of prompt $NO_x$. Both $NO_x$ reduction mechanisms rely on achieving thorough fuel/air mixing upstream of the combustor. Attempts to fully realize the low $NO_x$ potential of LPP combustion, however, have had only limited success due to autoignition occurring during fuel/air mixing and poor flame stability in the combustor at low equivalence ratios.

Autoignition of the fuel/air mixture during mixing liberates the fuel's chemical energy at a point at which it cannot be readily used and creates the potential for severely damaging the combustor. The tendency of any particular fuel/air mixture to autoignite is measured by the ignition delay time, which is the length of time at which the fuel/air mixture can be held at a particular temperature without autoigniting. Ignition delay times generally decrease with increasing mixture temperature. For example, a typical gas turbine engine fuel, Jet A, has an ignition delay time of about 0.1 millisecond (msec) at 1200° F. and 10 atmospheres (atm), a typical fuel/air mixture temperature for advanced gas turbine engines. The fuel/air mixture temperature is dictated by the temperature of the air, which is usually hot compressor discharge air. A short ignition delay time makes it very difficult to thoroughly mix the fuel and air to form a well-mixed, uniformly lean fuel/air mixture.

Poor flame stability is a problem inherent in many lean combustion schemes. As the equivalence ratio is decreased, flame stability decreases rapidly. Very simply, at low equivalence ratios the flame is blown out. The lowest equivalence ratio at which combustion can be sustained is known as the lean combustion limit. In order for LPP combustion to achieve its full $NO_x$ reduction potential, the problems of autoignition and flame stability must be solved.

Accordingly, what is needed in the art is a method and system for LPP combustion which decreases the autoignition tendency of the fuel/air mixture and extends the lean combustion limit.

DISCLOSURE OF THE INVENTION

The present invention is directed to a method and system for LPP combustion which decreases the autoignition tendency of the fuel/air mixture and extends the lean combustion limit.

One aspect of the present invention includes a method of combusting an endothermic fuel in a lean premixed/prevaporized combustion system. Thermal energy is transferred from a combustion air stream to an endothermic fuel decomposition catalyst, thereby cooling the combustion air stream and heating the catalyst to a temperature sufficient to endothermically decompose an endothermic fuel. The heated catalyst is contacted with at least a portion of the endothermic fuel stream, thereby causing the fuel stream to endothermically decompose into a reaction product stream. At least a portion of the reaction product stream is mixed with the cooled combustion air stream to form a well-mixed, uniformly lean fuel/air mixture having an increased ignition delay time. The fuel/air mixture is combusted at an equivalence ratio of less than 1, thereby producing a combustion product stream.

Another aspect of the invention includes a lean premixed/prevaporized system for combusting an endothermic fuel, including in combination, an endothermic fuel decomposition catalyst, means for transferring thermal energy from a combustion air stream to the endothermic fuel decomposition catalyst, thereby cooling the combustion air stream and heating the catalyst to a temperature sufficient to endothermically decompose an endothermic fuel, means for contacting the heated catalyst with at least a portion of the endothermic fuel stream, thereby causing the fuel stream to endothermically decompose into a reaction product stream, means for mixing at least a portion of the reaction product stream with the cooled combustion air stream to form a well-mixed, uniformly lean fuel/air mixture having an increased ignition delay time, and means for combusting the fuel/air mixture at an equivalence ratio of less than 1, thereby producing a combustion product stream.

The foregoing and other features and advantages of the present invention will become more apparent from the following description and accompanying drawings.

BEST MODE FOR CARRYING OUT THE INVENTION

Figures 1, 2:
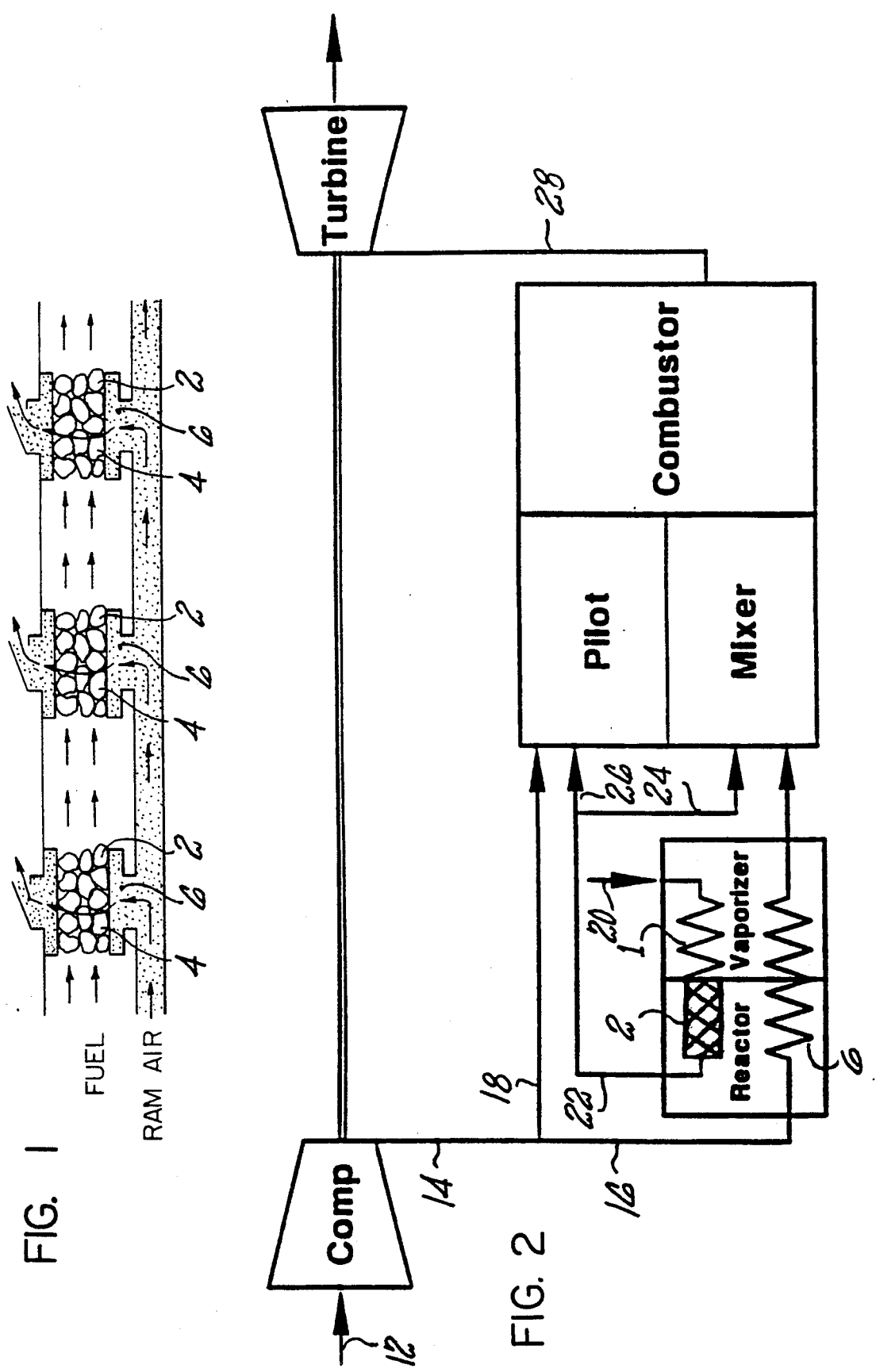
FIG. 1 is a schematic view of a heat exchanger-reactor which may be incorporated in the system of the present invention.
FIGS. 2, 3, and 4 are process flow diagrams of LPP combustion systems incorporating the present invention.

The present invention is compatible with any endothermic fuel capable of undergoing an endothermic decomposition reaction and may be used in conjunction with a wide variety of combustion devices including industrial process heaters, industrial gas turbines, aircraft gas turbines, and advanced aircraft engines such as those contemplated for the high speed civil transport and hypersonic propulsion. An endothermic decomposition reaction is one in which an endothermic fuel is decomposed into reaction products having lower molecular weights than the original endothermic fuel after absorbing a heat of reaction. Typically, endothermic decomposition reactions take place in the gas phase, providing an opportunity to transfer sensible and latent heat to the fuel in addition to a heat of reaction. Common endothermic decomposition reactions include the dehydrogenation of naphthenes to hydrogen and aromatics, the dehydrocyclization of paraffins to hydrogen and aromatics, the dissociation of methanol to hydrogen and carbon monoxide, and the cracking of hydrocarbons to hydrogen and a mixture of saturated and unsaturated hydrocarbons.

Fuels capable of undergoing dehydrogenation or dehydrocyclization reactions include $C_6$ to $C_{20}$ naphthenes, such as methylcyclohexane and cyclohexane, and normal paraffins having up to about 20 carbon atoms. The dehydrogenation or dehydrocyclization of these fuels may be catalyzed by any catalyst which promotes dehydrogenation, dehydrocyclization, or similar reactions. In particular, platinum, rhodium, iridium, palladium, nickel, chromium, cobalt, mixtures thereof, and zeolites supported on alumina or a similar substrate in the form of granules, extrudates, pellets, honeycombs, or any other conventional form have been found to be effective catalysts. Platinum, rhodium, iridium, palladium and mixtures thereof are preferred because of their greater effectiveness in catalyzing dehydrogenation and dehydrocyclization reactions. In order to dehydrogenate or dehydrocyclize at least of portion of the endothermic fuel, the catalyst should be contacted with the fuel at temperatures of about 200° F. to about 1400° F., preferably about 400° F. to about 1000° F., and pressures of about 0.1 atm to about 70 atm.

Fuels capable of undergoing cracking reactions include hydrocarbon fuels such as $C_2$ to $C_{20}$ normal paraffins, $C_3$ to $C_{20}$ isoparaffins, and conventional aircraft turbine fuels. The hydrocarbon fuels may be pure components or mixtures of components and may be distillate fuels having boiling points or ranges between about 200° F. and about 700° F. and specific gravities at 60° F. between about 0.65 and about 0.85. Preferably, the distillate hydrocarbon fuels will have aromatic contents of less than about 25 volume percent and flash points higher than about 100° F. Most preferably, the distillate hydrocarbon fuels will have high paraffin contents and, in particular, high normal paraffin contents. Suitable paraffinic fuels include Norpar TM 12 (Exxon Company, USA, Houston, Tex.), a commercial blend of $C_{10}$ to $C_{13}$ normal paraffins, and Isopar TM H (Exxon), a commercial blend of $C_{11}$ and $C_{12}$ isoparaffins. Suitable conventional aircraft turbine fuels include hydrocarbon fuels which contain paraffins and meet the requirements of the ASTM, IATA, military, or comparable specifications for such fuels or which a person skilled in the art would know to have comparable utility, particularly, but not limited to, those specified or described by ASTM specification D 1655 (Jet A and Jet B), IATA guidelines ADD 76-1 (kerosine and wide-cut), and USAF specifications MIL-T-5624L (JP-4 and JP-5), MIL-T-83133A (JP-8), MIL-T-38219A (JP-7), and MIL-T-25524C (TS).

The cracking reaction contemplated by the present invention is a gas phase reaction which produces a variety of products. For example, isoparaffins, normal paraffins, and conventional aircraft turbine fuels crack to a mixture of hydrogen, unsaturated hydrocarbons, such as acetylene, ethylene, propylene, butene, butadiene, pentadiene, pentene, and pentyne, and saturated hydrocarbons, such as methane, ethane, and butane. These products are generally smaller and more reactive than the original fuel. As a result, they have a lower lean combustion limit, meaning that they will produce a stable flame at lower equivalence ratios. In addition, the products are less prone to coking and soot formation than the original fuel.

Catalysts which have been found to be effective in catalyzing the cracking of hydrocarbons include chromium in the form of chromia; precious metal catalysts such as platinum, rhodium, iridium, ruthenium, palladium, and mixtures thereof; and zeolites. Chromium catalysts used for the present invention should contain about 5 weight percent (wt %) to about 33 wt % chromia, and preferably, about 25 wt % to about 30 wt % chromia. Precious metal catalysts used for the present invention should contain about 0.01 wt % to about 5 wt % precious metal. Preferably, the precious metal catalysts will contain about 0.1 wt % to about 1.0 wt % precious metal, and most preferably, about 0.3 wt % to about 0.5 wt % precious metal. In addition, the precious metal catalysts may contain promoters such as rhenium, as is known in the art. The chromium and precious metal catalysts may be supported on alumina or similar substrates in the form of granules, extrudates, pellets, honeycombs, or any other conventional form. Suitable chromium catalysts include Houdry Type C, a 30 wt % chromia/alumina catalyst which may be purchased from Air Products and Chemicals Company (Allentown, Pa.). Suitable precious metal catalysts include PR-8, a platinum-rhenium on alumina extrudate which may be purchased from American Cyanamid Company (Wayne, N.J.). Other suitable precious metal catalysts may be purchased from Engelhard Corporation (Iselin, N.J.) and UOP (Des Plaines, Ill.). Zeolites are the preferred catalysts for cracking hydrocarbons because they are more reactive and produce more unsaturated products than precious metal catalysts. The zeolites may be faujasites, chabazites, mordenites, silicalites, or any of the other types of zeolite known to catalyze hydrocarbon cracking and should have an effective pore diameter of about 3 Å to about 11 Å. Preferably, the zeolites will have an effective pore diameter of about 4 Å to about 8 Å. Suitable zeolite catalysts include Octacat, a faujasite which is available from W. R. Grace & Company (Baltimore, Md.), and several catalysts available from UOP (Des Plaines, Ill.) including SAPO-34 which is a chabazite, LZM-8 which is a mordenite, MFI-43, and MFI-47. The zeolites may be supported or stabilized in any suitable manner known in the art. For example, the zeolites may be supported on ceramic granules, extrudates, pellets, monoliths, or even metal foil honeycomb structures. Adhesion between the zeolite and support may be facilitated by mixing the zeolite with about 2 wt % to about 20 wt % of a colloidal material. Suitable colloidal materials include ceria; silica, such as Ludox TM LS which is available from E. I. DuPont de Nemours & Company (Wilmington, Del.); and organic titanium esters, such as Tyzor TM which is also available from DuPont.

Methanol is another endothermic fuel useful with the present invention because it has a large heat of vaporization, a high heat capacity, and can be endothermically dissociated to provide a high chemical heat sink and thermally stable products. The endothermic dissociation of methanol into hydrogen and carbon monoxide may be catalyzed by a mixture of about 35 wt % to about 80 wt % copper oxide and about 10 wt % to about 65 wt % zinc oxide. The catalyst may also contain up to about 25 wt % $Al_2O_3$. Suitable catalysts include L-951, a catalyst comprising 42 wt % CuO, 47 wt % ZnO, and 10 wt % $Al_2O_3$ as a stabilizer, which is available from United Catalyst Incorporated (Louisville, Ky.). The CuO-ZnO catalyst may be impregnated with about 0.5 wt % rhodium to increase its reactivity by wetting the catalyst with an aqueous rhodium nitrate solution.

In order to crack or dissociate at least a portion of the endothermic fuel, the catalyst should be contacted with the fuel at a pressure of about 1 atm to about 50 atm, preferably at a pressure above the fuel's critical pressure, and a liquid hourly space velocity (LHSV) of at least about 10 $hr^{-1}$ and especially about 10 $hr^{-1}$ to about 1000 $hr^{-1}$. In particular, the space velocity may range from about 20 $hr^{-1}$ to about 700 $hr^{-1}$. In some subsonic and supersonic aircraft applications, a space velocity between about 150 $hr^{-1}$ and about 250 $hr^{-1}$ would be acceptable. To crack hydrocarbons, the catalyst should be heated to a temperature of about 1000° F. to about 1500° F. and, preferably, about 1200° F. to about 1250° F. in order to achieve high conversions without using excessive temperatures. To dissociate methanol, the catalyst should be heated to a temperature of about 500° F. to about 1200° F. and, preferably, about 800° F. to about 1000° F.

Thermal energy to heat the fuel and catalyst to a temperature sufficient to endothermically decompose at least a portion of the fuel should come from a heated combustion air stream which may be any oxygen-containing stream, such as compressor discharge air. The compressor discharge air may be heated by compressing it from atmospheric pressure to a suitable higher pressure. Typically, the air stream will be heated to at least about 1200° F. by compression. Transferring thermal energy from the combustion air stream cools it, thereby decreasing the temperature of the fuel/air mixture which is produced downstream of the endothermic decomposition catalyst. The thermal energy in the combustion air stream can also be used to vaporize the fuel and heat it to reaction conditions. The heated fuel may be used to transfer thermal energy from the combustion air to the catalyst. The Table summarizes the amount of thermal energy which can be absorbed by several fuels of the present invention. The chemical heat sink is the amount of heat which can be absorbed to initiate the endothermic decomposition. The physical heat sink is the amount of heat which can be absorbed to vaporize and heat the fuel.

TABLE

| Fuel | Heat Sink (Btu/lb) | | |
|---|---|---|---|
| | Chemical | Physical | Total |
| MCH | 894 | 1031 | 1925 |
| Heptane | 1548 | 998 | 2546 |
| Norpar TM 12 | 1550 | 992 | 2542 |
| Isopar TM H | 1100 | 981 | 2081 |
| JP-7 | 1100 | 925 | 2025 |

The thermal energy may be transferred to the fuel and catalyst by any conventional heat transfer technique known in the art. Heat transfer may be facilitated by using a heat exchanger-reactor which incorporates the endothermic decomposition catalyst in a reaction zone and is provided with integral means for transferring thermal energy from the combustion air stream to the catalyst and means for contacting the catalyst with a hydrocarbon fuel. FIG. 1 shows one possible heat exchanger-reactor design in which a plurality of reaction zones 2 containing an endothermic decomposition catalyst 4 are heated by compressor discharge air flowing through a heat exchanger portion 6 without mixing with the fuel. Fuel contacting the heated catalyst endothermically decomposes into reaction products. The reaction zones 2 may be designed to provide the desired space velocity, pressure drop, and other parameters using conventional catalytic reactor design techniques. The heat exchanger portion 6 may be designed using conventional heat exchanger design techniques.

FIG. 2 shows the process flow for a preferred system of the present invention. A combustion air stream 12 is compressed to a suitable temperature and pressure, producing a heated combustion air stream 14. The heated combustion air stream 14 is divided into a first air stream 16 and a much smaller second air stream 18. The first air stream 16 passes through the heat exchanger portion 6 of a heat exchanger-reactor and transfers thermal energy to an endothermic decomposition catalyst in the reaction zone 2 of the heat exchanger-reactor, thereby cooling the first air stream 16 and heating the catalyst to a temperature sufficient to endothermically decompose at least a portion of a hydrocarbon fuel stream 20. The fuel stream 20 first passes through a vaporizer 1 where it is vaporized and heated to reaction conditions. It then enters the reaction zone 2 of the heat exchanger-reactor and contacts the heated catalyst, thereby endothermically decomposing into a reaction product stream 22. The reaction product stream 22 is divided into a main fuel stream 24 and a much smaller pilot fuel stream 26. The cooled first air 16 exiting the heat exchanger portion 6 of the reactor-heat exchanger is mixed with the main fuel stream 24 in a mixer to form a well-mixed, uniformly lean fuel/air mixture. Preferably, the fuel/air mixture will have an equivalence ratio less than about 0.6 and, most preferably, less than about 0.3. The mixer may be any conventional mixing device capable of uniformly mixing air with a gaseous fuel. The residence time in the mixer should be less than the fuel's ignition delay time to prevent autoignition. The second air stream 18 is mixed with the pilot fuel stream 26 and combusted in a pilot burner, which supports combustion in the combustor. The pilot burner may be any conventional pilot device capable of supporting combustion in the combustor. The equivalence ratio in the pilot burner may range from about 0.4 to about 2.0 and, preferably, will be less than about 0.8 or greater than about 1.2, and most preferably, will be less than about 0.6 or greater than about 1.4. The fuel/air mixture is combusted in the combustor at an equivalence ratio less than 1 to produce a combustion product stream 28. Preferably, the equivalence ratio in the combustor will be less than about 0.7 and, most preferably, will be less than about 0.5. The residence time in the combustor should be less than about 5 msec and, preferably, will be between about 0.5 msec and about 2.0 msec. The combustor may be any conventional combustion device capable of promoting lean combustion of a gaseous fuel/air mixture. The combustion product stream 28 is expanded across a turbine to produce shaft work to drive the compressor and may then be used to provide propulsion or additional shaft work.

Figure 3:
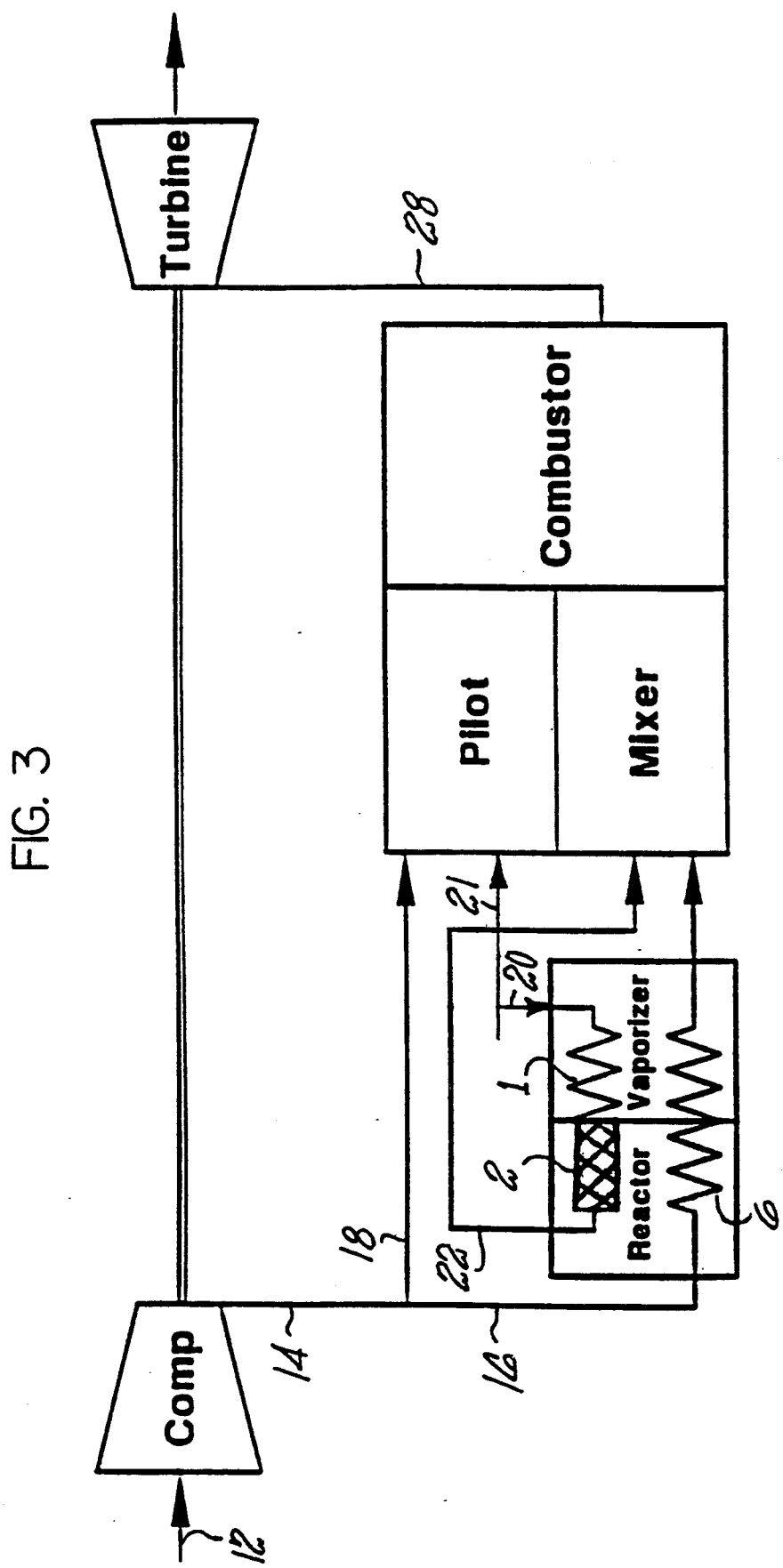
Figure 4:
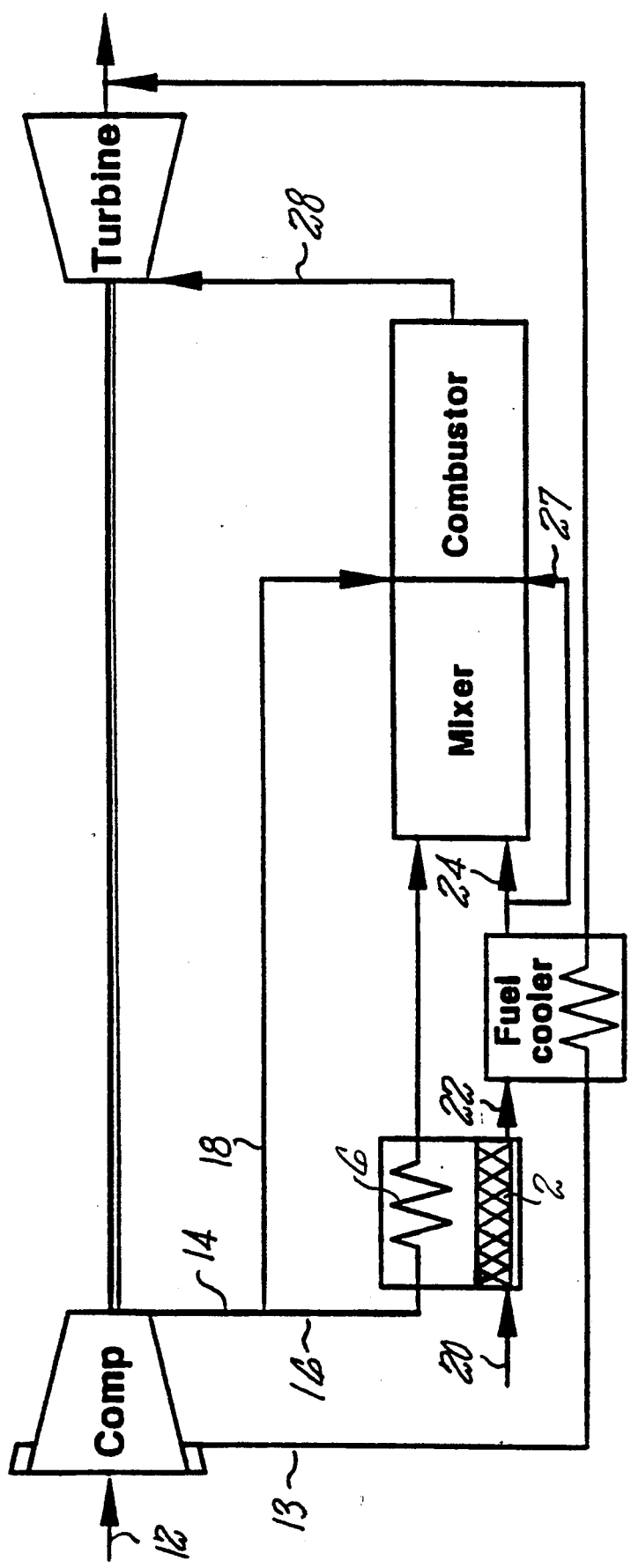

FIG. 3 shows an alternate configuration of the system in which the pilot burner is fueled with nondecomposed hydrocarbon fuel stream 21. FIG. 4 shows yet another system in which there is no pilot burner, the reaction product stream 22 is cooled with compressor bypass stream 13 in a fuel cooler to further increase the ignition delay time of the fuel/air mixture, and the cooled reaction product stream 22 is divided into a main fuel stream 24 and a second fuel stream 27. If desired, rather than cooling the reaction product stream 22 in a fuel cooler, the reaction product stream 22 may be expanded across a turbine to produce power.

EXAMPLE

A LPP combustion system similar to that depicted in FIG. 2 was modelled according to conventional techniques which are known in the art. The engine was operated at a fuel/air ratio of 0.03. The combustion air exiting the compressor at 1200° F. and 10 atm was divided into two streams, 85% to a first air stream and 15% to a second air stream. The first air stream was passed through the heat exchanger portion of a heat exchanger-reactor where it heated a zeolite hydrocarbon cracking catalyst to 1200° F. and was cooled to 1050° F. JP-7 was contacted with the heated catalyst at a liquid hourly space velocity of 150 hr$^{-1}$ and cracked into a reaction product stream comprising hydrogen and a mixture of saturated and unsaturated hydrocarbons. The reaction product stream exiting the reactor was divided into two streams, 85% to a main fuel stream and 15% to a pilot fuel stream. The first air stream was mixed with the main stream in a mixer at an equivalence ratio of 0.2 and a residence time of 1 msec to form a well-mixed, uniformly lean fuel/air mixture. The second air stream was mixed with the pilot fuel stream and combusted in a pilot combustor at an equivalence ratio of 1.8. The fuel/air mixture was then combusted in a combustor at an equivalence ratio of 0.44 and a residence time of 2 msec to produce to a combustion products stream at 2900° F.

Figure 5:
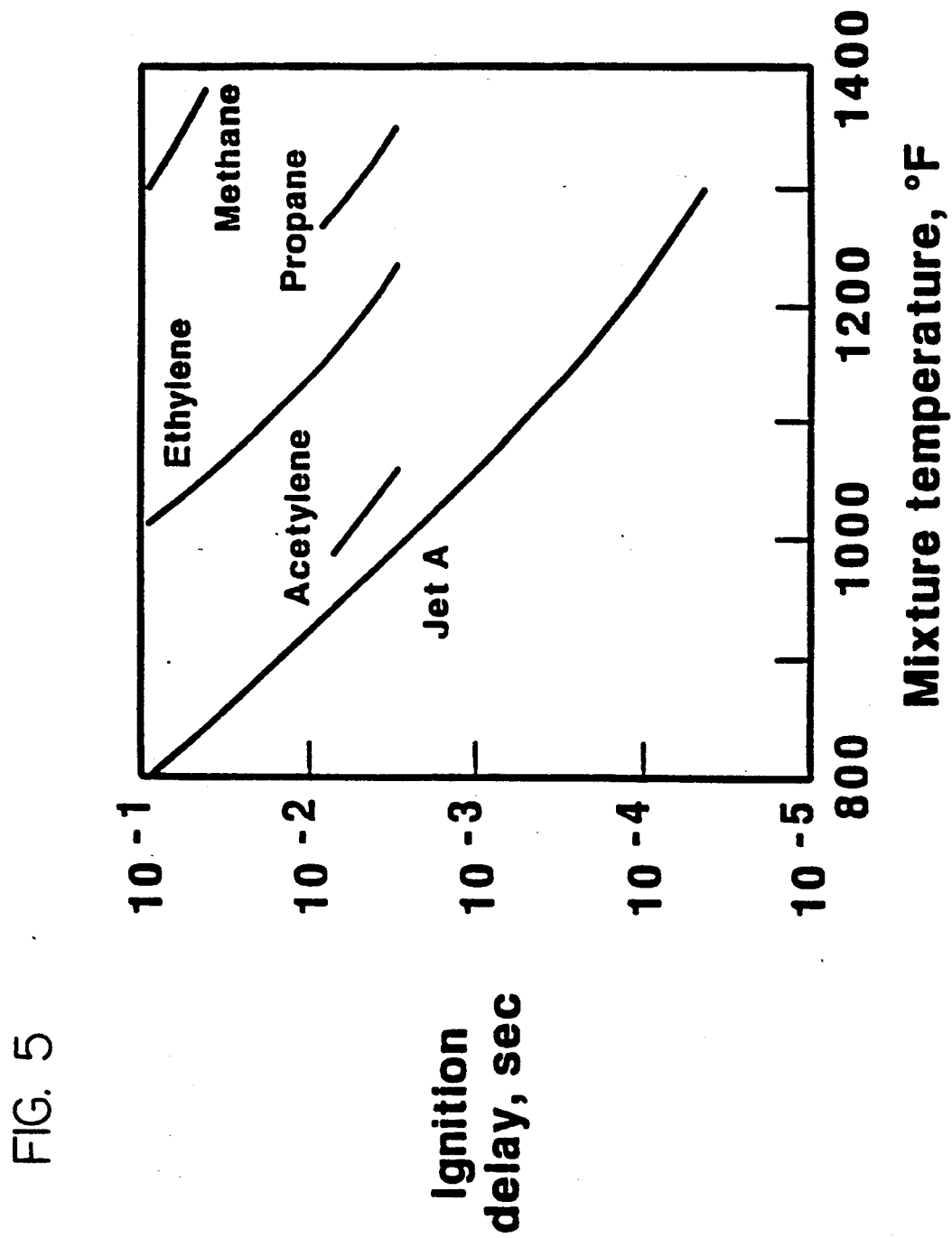
FIG. 5 depicts the ignition delay time of several hydrocarbon fuels at 10 atm versus fuel/air mixture temperature.

The present invention can improve the operation of a LPP combustion system in several ways. First, the ignition time delay of the fuel/air mixture is increased by cooling the combustion air, which in turn decreases the temperature of the fuel/air mixture. The dramatic impact of a lower fuel/air mixture temperature on ignition delay time can be seen in FIG. 5. The ignition delay time is further increased at any particular temperature because the reaction products formed by the endothermic decomposition reaction, primarily light products such as acetylene, ethylene, propane, and methane, are inherently more resistant to autoignition that the original fuel. In addition, the hydrogen product, which is very reactive at high temperatures, has an even longer ignition delay time that the hydrocarbon products at temperatures less than about 1500° F. because of a competing low temperature preignition reaction that removes hydrogen from the system. Increasing the ignition delay time provides enough time to produce a well-mixed, uniformly lean mixture.

Second, low equivalence ratio flame stability in the combustor is improved because the reaction products formed by the endothermic decomposition are lighter and more reactive than the original fuel. As a result, the combustor can be operated at lower equivalence ratios, reducing $NO_x$ emissions.

Third, because the reaction products formed by the endothermic decomposition are less prone to coking than the original fuel, there should be a reduction in fouling in the fuel system.

Fourth, the hydrogen product formed in the endothermic reaction will inhibit the formation of prompt $NO_x$ in the flame zone by providing alternative paths for reaction.

It should be understood that the invention is not limited to the particular embodiments shown and described herein, but that various changes and modifications may be made without departing from the spirit or scope of the claimed invention.

We claim:

1. A method of combusting an endothermic fuel in a lean premixed/prevaporized combustion system, comprising:
   (a) transferring thermal energy from a combustion air stream to an endothermic fuel decomposition catalyst, thereby cooling the combustion air stream and heating the catalyst to a temperature sufficient to endothermically decompose an endothermic fuel;
   (b) contacting the heated catalyst with at least a portion of the endothermic fuel stream, thereby causing the fuel stream to endothermically decompose into a reaction product stream;
   (c) mixing at least a portion of the reaction product stream with the cooled combustion air stream to form a well-mixed, uniformly lean fuel/air mixture having an increased ignition delay time; and
   (d) combusting the fuel/air mixture at an equivalence ratio of less than 1, thereby producing a combustion product stream.

2. The method of claim 1 further comprising combusting a portion of the endothermic fuel stream or a portion of the reaction product stream in a pilot burner.

3. The method of claim 1 further comprising cooling the reaction product stream before step (c).

4. The method of claim 1 further comprising expanding the reaction product stream across a turbine before step (c), thereby producing power.

5. The method of claim 1 further comprising expanding the combustion product stream across a turbine, thereby producing power.

6. The method of claim 1 wherein the reaction product stream is mixed with the cooled combustion air stream at an equivalence ratio of less than about 0.6.

7. The method of claim 1 wherein the fuel/air mixture is combusted at an equivalence ratio of less than about 0.7.

8. The method of claim 1 wherein the endothermic fuel decomposition catalyst comprises a catalyst selected from the group consisting of nickel, cobalt, chromium, platinum, rhenium, rhodium, iridium, ruthenium, palladium, mixtures thereof, and zeolites.

9. The method of claim 1 wherein the catalyst is heated to a temperature of about 400° F. to about 1500° F.

10. The method of claim 1 wherein the endothermic fuel comprises hydrocarbons selected from the group consisting of $C_6$ to $C_{20}$ naphthenes, $C_2$ to $C_{20}$ normal paraffins, $C_2$ to $C_{20}$ isoparaffins, and mixtures thereof.

11. The method of claim 1 wherein the endothermic fuel is a mixture of hydrocarbons having a boiling point between about 200° F. to about 700° F. and a specific gravity at 60° F. between about 0.65 and about 0.85.

12. The method of claim 1 wherein the endothermic fuel comprises methanol and the endothermic fuel decomposition catalyst comprises a mixture of copper oxides and zinc oxides.

13. A lean premixed/prevaporized system for combusting an endothermic fuel, comprising in combination:
(a) an endothermic fuel decomposition catalyst;
(b) means for transferring thermal energy from a combustion air stream to the endothermic fuel decomposition catalyst, thereby cooling the combustion air stream and heating the catalyst to a temperature sufficient to endothermically decompose an endothermic fuel;
(c) means for contacting the heated catalyst with at least a portion of the endothermic fuel stream, thereby causing the fuel stream to endothermically decompose into a reaction product stream;
(d) means for mixing at least a portion of the reaction product stream with the cooled combustion air stream to form a well-mixed, uniformly lean fuel/air mixture having an increased ignition delay time; and
(e) means for combusting the fuel/air mixture at an equivalence ratio of less than 1, thereby producing a combustion product stream.

14. The system of claim 13 further comprising a pilot burner for combusting a portion of the endothermic fuel stream or a portion of the reaction product stream.

15. The system of claim 13 further comprising means for cooling the reaction product stream before it mixes with the cooled combustion air stream.

16. The system of claim 13 further comprising a turbine for expanding the reaction product stream before it mixes with the cooled combustion air stream to produce power.

17. The system of claim 13 further comprising a turbine for expanding the combustion product stream to produce power.

18. The system of claim 13 wherein the endothermic fuel decomposition catalyst comprises a catalyst selected from the group consisting of nickel, cobalt, chromium, platinum, rhenium, rhodium, iridium, ruthenium, palladium, mixtures thereof, and zeolites.

19. The system of claim 13 wherein the endothermic fuel comprises hydrocarbons selected from the group consisting of $C_6$ to $C_{20}$ naphthenes, $C_2$ to $C_{20}$ normal paraffins, $C_3$ to $C_{20}$ isoparaffins, and mixtures thereof.

20. The system of claim 13 wherein the endothermic fuel is a mixture of hydrocarbons having a boiling point between about 200° F. to about 700° F. and a specific gravity at 60° F. between about 0.65 and about 0.85.

21. The system of claim 13 wherein the endothermic fuel comprises methanol and the endothermic fuel decomposition catalyst comprises a mixture of copper oxides and zinc oxides.

* * * * *

UNITED STATES PATENT AND TRADEMARK OFFICE
CERTIFICATE OF CORRECTION

PATENT NO. : 5,165,224
DATED : 24 November 1992
INVENTOR(S) : Louis J. Spadaccini et al.

It is certified that error appears in the above-indentified patent and that said Letters Patent is hereby corrected as shown below:

Claim 10, column 9, line 29, "paraffins, $C_2$ to $C_{20}$ naphthenes," should be --paraffins, $C_3$ to $C_{20}$ isoparaffins--.

Signed and Sealed this

Twenty-third Day of November, 1993

Attest:

BRUCE LEHMAN

Attesting Officer

Commissioner of Patents and Trademarks